UNITED STATES PATENT OFFICE.

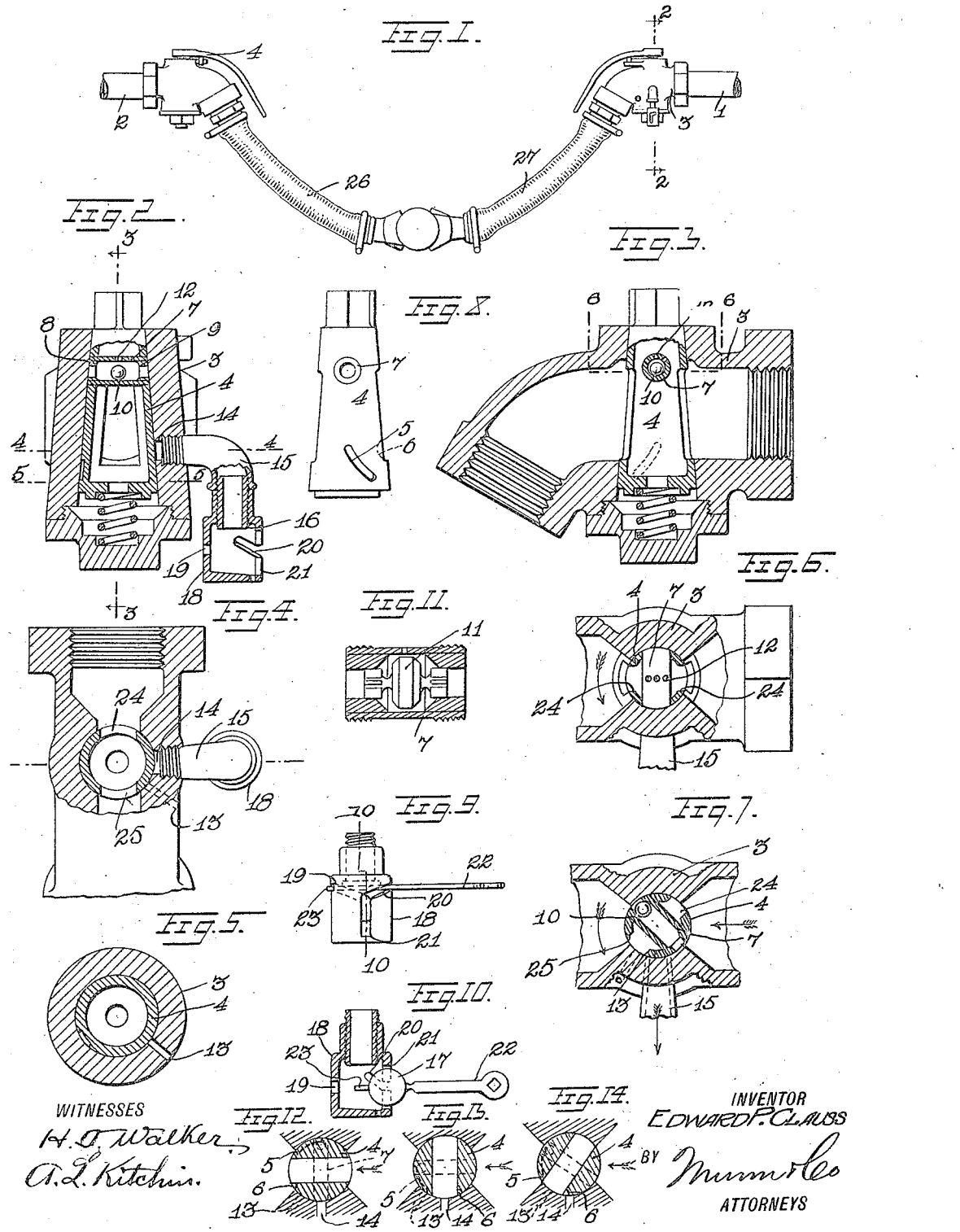

EDWARD P. CLAUSS, OF LYONS, NEW YORK.

CUT-OFF RELIEF AND AUTOMATIC CONTROL AIR-BRAKE VALVE.

1,403,293.      Specification of Letters Patent.    Patented Jan. 10, 1922.

Application filed October 21, 1920. Serial No. 418,359.

*To all whom it may concern:*

Be it known that I, EDWARD P. CLAUSS, a citizen of the United States, and a resident of Lyons, in the county of Wayne and State of New York, have invented a new and Improved Cut-Off Relief and Automatic Control Air-Brake Valve, of which the following is a full, clear, and exact description.

This invention relates to the air brake system of railway trains and particularly to a cut-off air brake valve which in addition acts as a relief and automatic control valve.

An object in view is to provide an improved valve for air brake systems which will not overlap and will, therefore, either bleed the line or hold the same closed and the brakes properly released.

Another object in view is to provide a construction of a valve which will not depart from the present construction radically but which will utilize the good features thereof and in addition prevent accidents through the improper turning of any valve.

A still further object more specifically is to provide a valve of the character mentioned in which means are provided for bleeding the train line on both sides of the valve when turned to any other than an open position.

In the accompanying drawings—

Figure 1 is a side view of a pair of valves disclosing an embodiment of the invention, the same being shown applied to part of a train line system.

Figure 2 is a sectional view on an enlarged scale through Figure 1, the section being taken on line 2—2.

Figure 3 is a sectional view through Figure 2 on line 3—3.

Figure 4 is a horizontal sectional view through Figure 2 on line 4—4.

Figure 5 is a horizontal sectional view through Figure 2 on line 5—5.

Figure 6 is a fragmentary sectional view approximately on line 6—6 of Figure 3.

Figure 7 is a fragmentary sectional view similar to Figure 6 but with the valve plug turned to an almost closed position.

Figure 8 is a side view of a valve plug and embodying certain features of the invention.

Figure 9 is a side view of a relief pipe with a closure key arranged therein.

Figure 10 is a sectional view through Figure 9 approximately on line 10—10.

Figure 11 is a detailed longitudinal sectional view through a slightly modified form of double check valve to that shown in Figure 2.

Figure 12 is a diagram showing a valve structure with the plug in an open position.

Figure 13 is a view similar to Figure 12 but showing the valve plug closed.

Figure 14 is a view similar to Figure 13 but showing the valve half closed but with the passage-way out of communication with the pipe line.

Referring to the accompanying drawings by numeral, 1 and 2 indicate air pipes for adjacent cars, each pipe being provided with a cut-off valve 3 constructed in accordance with the present invention. These valves are of the usual construction now in common use on railways but this particular form of valve is designed to cause the air line to be bled as soon as the valve has been turned to a substantially closed position. When a valve similar to valve 3 is turned to a closed position or a substantially closed position, the cars in the rear of the valve are out of control of the engineer and, consequently, he cannot bleed the air line of these cars so as to apply the brakes thereto.

In the past, unauthorized persons have sometimes turned the valves 3 off at a point immediately back of the engine and, consequently, completely took the brakes out of the control of the engineer so that in case he desired to stop quickly he could not do so as he could not bleed the entire air line but only the engine. In the ordinary valves now in use there is provided no bleeding openings when a valve is just closed or substantially closed. In the present invention it is the intention to reconstruct the valve now in common use so that whenever it is moved to a position which will take the control from the engineer, passage-ways will be opened which will bleed the line both in front and rear of the valve so turned. In order to accomplish these results the plug 4 of valve 3 is provided with a curved passage-way 5 as shown in Figure 8, and with a cut-out portion 6 (Fig. 13). In addition a tubular member 7 is fitted into the plug 4 near the upper end and extends entirely therethrough, said tube having valve seats 8 and 9 adapted to co-act with the ball valve 10 closing the tube at either end. If desired an ordinary double acting valve 11 could be used as shown in Figure 11 though the ball structure is believed to be preferable. The pipe 7 is provided with a number of apertures 12 preferably on its upper part so that the interior thereof will always be in free communication with the interior of the plug 4.

The casing of valve 3 is provided with what may be termed a rear bleeding opening 13 and the main bleed opening 14 in which relief pipe 15 is fitted. This pipe is provided with a valve seat 16 adapted to engage the valve member 17 when arranged as shown in Figure 9. In order that this may take place a tubular member 18 is connected with the seat 16 and provided with a closed lower end as well as with spiral slots 19 and 20. A vertical slot 21 intersects the end of slot 20 so that the valve 17 connected with the key 22 may be moved into the tube 18 until the pin 23 of the key 22 enters the slot 19. The valve 17 is then turned so as to face the seat 16 so that when the key 22 is moved upwardly and then rotated the valve will be forced to the upper end of the slots 19, 20 and the upper part of the valve member 17 will press against the seat 16 and thereby close the relief pipe 15. When the valve 3 is turned off completely the openings or passage-ways 24 and 25 will be in free communication with the relief pipe 15 so that where it is desired to uncouple one or more rear cars the key 22 with its valve 17 is inserted until it assumes the position shown in Figure 9. The valve is then turned off and the hose 26, 27 disconnected after which a dummy hose is connected to the hose 27. For instance, the valve 3 is then turned on but by reason of the pumping hose being connected to the hose 27 none of the air can escape. Key 22 is then removed as it has already performed this function. When the valve is turned off without the use of a key 22, the line in front or toward the engine bleeds, through the pipe 7, apertures 12, plug 4 and from thence out the relief pipe 15. At the same time, air will be bled from the rear cars through the passage-ways 5 and the bleeding passage-way 13. As the bleeding through the tube 7 is much faster than through the passage-way 13, the air on the engine side of the valve will soon become less than on the opposite side so that the valve ball 10 will be forced away from said seat on the rear end of the tube 7. This will allow some of the air on the rear cars to bleed through the pipe 7.

As soon as the pressure of air in the rear cars is decreased to a certain extent, the action of the pump on the air pipe of the front cars will cause the pressure in such pipes to be greater than the rear pipes and cause ball 10 to reseat itself on the seat nearer the rear cars. The ball will reciprocate or move back and forth probably a number of times under these conditions until substantially all of the air has been bled from the line, notwithstanding the action of the pump. This will cause the engineer to realize that there is something wrong with the system if the train is in motion or ostensibly under the control of the engineer.

In Figures 12 and 13 will be seen diagrams illustrating these actions. In these diagrams it will be seen that when the valve is fully opened, air may freely pass from the rear cars to the front cars but when the valve is fully closed the rear cars will bleed through passage-ways 5 and 13, while the front cars will bleed through the pipe 7, plug 4 and pipe 15. In case the valve is almost closed as shown in Figure 7 the notch 6 will permit the air from both sides of the valve to bleed through the notch 6 into the pipe 15. If the valve is closed a short distance from that illustrated in Figure 7 it will assume the position shown in Figure 14 where the passage-ways 24 and 25 and the plug are completely closed so that the control of the rear cars are cut-off from the engineer. In a case like this both the cars in front and rear of the valve must bleed through the pipe 7 alternately as above described.

From these given figures it will be seen that the construction is such that there is no bleeding when the valve is completely open or substantially open but the bleeding action begins at some point when the parts are almost closed and such bleeding action continues from such position up to a fully closed position. This will prevent any authorized or unauthorized person turning the valve to either closed or partially closed position without bleeding the system and, consequently, applying the brakes.

What I claim is:

1. A train valve of the character described comprising a casing having a passage-way therethrough and a plug having a passage-way therethrough, said casing having a rear bleeding passage-way and a relief passage-way, said plug having an inclined groove on its face at one point co-acting with part of the main passage-way in said casing and with the bleeding passage-way in the casing and a bleeding tube arranged in said plug extending from one side to the other formed with openings substantially in the center and a valve member in the tube closing either end thereof.

2. A train valve of the character described comprising a casing having a main passage-way therethrough, a relief passage-way and a bleeding passage-way, a plug for said casing having a main passage-way therethrough for registering with the main passage-way in the casing when fully opened and a tube extending through the plug, said tube being open at both ends and provided with openings substantially centrally thereof communicating with the interior of the plug, a valve arranged in said tube for closing either end thereof, said plug being provided with a bleeding groove on one face extending from a point directly below one end of said tube to a point below and near one end of the opening through the plug, said groove communicating with said bleeding passage-way when the plug is closed and said plug being also formed with a notch merging into the main passage-way thereof, said notch acting to bring the main passage-way of the plug into communication with the relief passage-way of the casing before the passage-way in the plug is completely out of communication with the main passage-way in said casing.

3. A relief pipe for cut-off valves connected with the casing of the valve and having a valve seat arranged therein, a pair of spiral slots one of which merge into an extra slot extending substantially at right angles to the spiral slots and a valve member having a bar and a seating engaging portion, said valve member being capable of insertion through said last-mentioned slot while the bar is capable of a rotatable movement in said spiral slots for forcing the bar member against said seats and thereby preventing the passage of air through said relief pipe.

EDWARD P. CLAUSS.